United States Patent [19]

Renold

[11] Patent Number: 4,778,093
[45] Date of Patent: Oct. 18, 1988

[54] FILM TRANSPORT ASSEMBLY

[76] Inventor: Walter Renold, 7044 MaryEllen Ave., North Hollywood, Calif. 91605

[21] Appl. No.: 37,427

[22] Filed: Apr. 13, 1987

[51] Int. Cl.$^4$ .................... B65H 20/24; G03B 1/18
[52] U.S. Cl. .................................. 226/113; 226/119; 352/185
[58] Field of Search ............... 226/108, 118, 119, 113, 226/114; 242/179, 75.3; 352/18 S, 186; 353/26 R

[56] References Cited

U.S. PATENT DOCUMENTS

| | | |
|---|---|---|
| 529,582 | 7/1899 | Mason . |
| 704,449 | 7/1902 | Edwards . |
| 1,905,446 | 4/1933 | Dewey et al. . |
| 2,039,906 | 5/1936 | Howell . |
| 2,762,255 | 9/1956 | Anderson ........................... 352/18 S |
| 2,998,748 | 9/1961 | Dessilani . |
| 3,201,798 | 8/1965 | Mayer, Jr. et al. . |
| 3,613,978 | 10/1971 | Renold . |
| 4,537,482 | 8/1985 | Weiner ................................ 352/186 |

FOREIGN PATENT DOCUMENTS

| | | | |
|---|---|---|---|
| 559446 | 12/1923 | France . | |
| 580352 | 11/1924 | France . | |
| 979656 | 4/1957 | France ................................ | 352/185 |
| 412921 | 3/1946 | Italy . | |

*Primary Examiner*—Stuart S. Levy
*Assistant Examiner*—Lynn M. Sohacki
*Attorney, Agent, or Firm*—Kelly, Bauersfeld & Lowry

[57] ABSTRACT

An improved film transport assembly is provided for intermittently advancing film, without pulldown claws or similar mechanisms for engaging film perforations to obtain intermittent transport, with extended dwell period past the film gate of a camera or projector, particularly such as a motion picture camera or projector adapted for high speed film transport or for handling relatively large film formats. The transport assembly includes film supply and takeup sprockets for constant velocity film transport respectively to and from the film gate, with the film passing over a primary roller and a compensation roller interposed between each sprocket and the film gate. The pairs of primary rollers and compensation rollers are displaced generally sinusoidally and at different cyclic rates to increase the film path length between the supply sprocket and gate while decreasing the film path length between the takeup sprocket and gate, and vice versa, resulting in a net film velocity of zero at the gate for a dwell period of up to 180 degrees, followed by generally sinusoidal transport of the film through a transport period of about 180 degrees to register the next film frame with the gate. Limited phase shift between the cyclic motions of the primary and compensation rollers will permit use of relatively simple sinusoidal displacement functions for improved balancing without film binding. Mechanisms are also disclosed for adjusting film position, film tension, and for accommodating films of different perforation pitch.

13 Claims, 8 Drawing Sheets

FILM TRANSPORT ASSEMBLY

BACKGROUND OF THE INVENTION

This invention relates generally to an improved film transport assembly for intermittently advancing film one frame at a time to a film gate in a motion picture camera or projector or the like. More particularly, this invention provides a film transport assembly for high speed intermittent film advancement and/or advancement of relatively large film formats while providing an extended cycle dwell or exposure period for each film frame at a film gate.

Motion picture cameras and projectors and the like are well known wherein an elongated strip of film is advanced from a supply reel for passage through a film gate and subsequent winding onto a takeup reel. The supply and takeup reels are normally driven by sprocket drives or the like to advance the film at a substantially constant or linear velocity respectively to and from the film gate. However, between these reels and the film gate, the film is typically displaced through relatively free loops which permit a conventional pulldown claw mechanism or the like adjacent the film gate to displace the film past the gate with intermittent motion. In this manner, each film frame is halted at the film gate for a brief dwell period to permit film exposure or projecting of an image therefrom before film transport to the next film frame in sequence. While this free loop film transport arrangement is widely used and functions adequately for many standard film format sizes and film transport speeds, such free loop arrangements do not function well with large film formats requiring rapid transport speeds between frames or with cameras adapted for high speed operation, for example, on the order of several hundred frames per second or more. In particular, at these operating conditions, the use of free film loops tends to result in undesirable instabilities during transport including loop flutter and/or vibrations, resulting in imprecise frame-to-frame registration at the film gate.

Various mechanisms have been proposed for permitting increased film transport or increased cycle speeds without introducing mechanical instabilities. Such mechanisms have included, for example, a variety of resilient means such as spring devices and the like for holding the otherwise free film loops under tension during film transport. However, such approaches are susceptible to uncontrolled vibration and flutter due to natural mechanical resonant frequencies. In addition, such use of resilient or spring devices undesirably applies excessive forces to the film resulting in excessive film wear and frequent incidents of film breakage.

One improved intermittent film transport mechanism is shown and described in U.S. Pat. No. 3,613,978. In particular, this patent discloses a captive loop transport arrangement wherein film is advanced at constant speed respectively to and from a film gate by conventional supply and takeup sprockets. Between each sprocket and the gate, however, the film is passed in a captive manner over two rollers which are displaced according to sinusoidal displacement functions and at the same cyclic rates. These rollers are designed to increase the film path length between the supply sprocket and gate while simultaneously decreasing the gate-takeup sprocket path length in a manner stopping the film at the gate for a dwell period of 90 degrees of the total frame-to-frame cycle, followed by film transport over the remainder of said cycle to register the next film frame with the gate. However, while this film transport arrangement functions successfully for its intended purpose, the dwell period of up to 90 degrees can be too short particularly wherein relatively high transport speeds are desired, for example, speeds on the order of 500 to 1,000 frames per second or more.

The present invention also utilizes two moving rollers on the supply and takeup sides of a film gate, although one variation of the invention may use the dual rollers on the takeup side only. However, the invention improves upon prior apparatus by moving the roller sets at different cyclic rates and amplitudes to achieve an extended dwell period of substantially one half, or 180 degrees, of the total frame-to-frame cycle.

SUMMARY OF THE INVENTION

In accordance with the invention, an improved film transport assembly is provided for intermittently advancing film through the film gate of a camera or projector, particularly such as a motion picture camera or projector adapted for high speed film transport or for handling relatively large film formats. The film transport assembly is designed for stopping each film frame at the gate for an extended dwell period greater than 90 degrees and up to 180 degrees of the total film transport cycle, followed by relatively smooth film transport as a generally sinusoidal displacement function over the remainder of the film transport cycle to register the next film frame in sequence with the film gate, while maintaining the film substantially unyieldingly captive at all times. Traditional pulldown claw mechanisms or other structures for intermittently engaging film perforations are avoided.

In accordance with the basic operation of the invention, film is drawn from a supply reel by a supply means at constant velocity for advancement toward and passage through the film gate, followed by further drawing of the film by a takeup means at the same constant or linear velocity for winding onto a takeup reel. Motion conversion means are interposed between the supply means and the film gate and between the takeup means and the film gate for converting the substantially constant velocity displacement of the film to a captive loop, intermittent motion. More particularly, during the exposure or dwell period, the motion conversion means at the supply side of the gate stores the film at the same rate as film is supplied by the supply means. Simultaneously, at the takeup side of the gate, the motion conversion means releases film to the takeup means at the same constant velocity. Consequently, the film movements attributable to the supply and takeup means are offset resulting in a net film velocity of zero at the film gate. During the remaining one-half or 180 degrees of the transport cycle, however, the motion conversion means cooperate with the supply and takeup means to yield a smooth, substantially sinusoidal transport of the film past the film gate to register the next frame in sequence with the gate at the beginning of the subsequent dwell period.

In a preferred form, the motion conversion means comprises a pair of primary rollers respectively interposed between the supply reel and gate and the takeup reel and gate, wherein these rollers are displaced generally according to complementary sinusoial functions at a cyclic rate corresponding with the total film frame-to-frame transport cycle. These primary rollers are respectively associated with a corresponding pair of compensation rollers which are displaced through complementary, approximate sinusoidal compensating functions but at a different cyclic rate of twice the rate of the primary rollers, and at different magnitudes. During the dwell period, the primary and compensation rollers before the film gate cooperatively increase the film path length between a constant velocity supply sprocket and gate while the primary and compensating rollers after the gate decrease the film path length between the gate and a takeup sprocket as a linear function during the dwell period to offset the linear velocities imparted to the film by the supply/takeup sprockets, thereby yielding a net film velocity of zero at the film gate. During the subsequent transport period, however, the primary and compensation rollers cooperatively decrease the film path length before the gate while increasing the post-gate path length as a generally sinusoidal function which thereby adds to the substantially constant supply/takeup sprocket velocities and thus transports the film with smooth acceleration and deceleration to the next film frame. In one form, the primary and compensation rollers may be mechanically-driven through the appropriate displacement functions, whereas in another form the rollers may be constituted by eccentric rollers to yield the desired displacement functions.

In accordance with further aspects of the invention, the compensation rollers can be displaced through a relatively simple sinusoidal displacement which simplifies the mechanism and facilitates overall balancing for improved high speed operation. This function does nearly but not precisely correspond with the true displacement function required to achieve the desired dwell and transport motions, in combination with the primary rollers displaced through simple sinusoidal displacement functions. When such simple sinusoidal functions are used for both sets of rollers, the compensation rollers are advantageously subjected to limited phase shifts relative to each other to prevent film binding and thereby insure minimum film wear and breakage risk without introducing significant mechanical instabilities.

According to still further features of the invention, the transport assembly includes means for adjustment of film tension and precise frame position at the film gate to insure proper film-gate registration at the beginning of each dwell period.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the exemplary drawings, an improved film transport assembly referred to generally in FIGS. 1-4 by the reference numeral 10 is provided for advancing film 12 in an intermittent manner for exposure and/or projection one frame at a time at a film gate 14. The film transport assembly 10 is adapted for maintaining each film frame stationary at the film gate 14 for an extended dwell period of up to 180 degrees, or one-half of the total frame-to-frame film transport cycle wherein the film gate corresponds with the optical axis of the camera or projector.

The improved film transport assembly 10 of the present invention advances the film 12 at constant velocity from a supply reel 16 for passage through the film gate 14 followed by rewinding at constant velocity onto a takeup reel 18. This constant velocity displacement of the film is achieved by a supply sprocket 22 and a takeup sprocket 24, both of which are rotatably driven at the same constant speed. However, during film travel between the supply and takeup sprockets 22 and 24, the film 12 passes over a plurality of rollers in a substantially captive loop fashion, wherein these rollers provide a motion conversion means for converting the constant velocity film movement to a specified intermittent film motion designed to halt each film frame at the film gate 14 for an extended dwell period. This extended dwell period is followed by a film transport period with smooth film acceleration and deceleration which concludes upon indexing the next film frame into registry with the film gate 14. This roller/motion conversion means, which will be described in more detail, advantageously provides a stationary film dwell period at the gate 14 for up to 180 degrees of the total film transport cycle, thereby rendering the invention particularly useful with relatively high speed motion picture cameras or projectors. In this regard, the present invention constitutes an improvement upon the inventor's prior U.S. Pat. No. 3,613,978, which includes roller/motion conversion means adapted for film dwell periods of up to 90 degrees.

FIGS. 1-4 illustrate one preferred form of the film transport assembly 10 which can be adapted for use as a camera or projector, as desired. As shown, the transport assembly 10 comprises the supply reel 16 and takeup reel 18 mounted on a common frame 20 for rotational movement, all in a well known manner. The supply sprocket 22 is also rotatably supported on the frame 20 and is rotatably driven at a constant velocity by an appropriate drive motor (not shown) or the like for drawing the film 12 at constant velocity from the supply reel 16. Sprocket teeth 23 are typically provided on the sprocket 22 for registration with perforations 25 or the like in the film 12 to insure constant speed film advancement in a positive drive manner, although other types of film engagement means and drive means may be provided.

The film 12 is advanced from the supply sprocket 22 for passage through the film gate 14 and ultimate rewinding onto the takeup reel 18. As depicted in the illustrative drawing, such rewinding onto the takeup reel 18 also occurs at a constant film drive speed by passage of the film 12 over the takeup drive sprocket 24 rotatably supported on the frame 20 and driven by appropriate means (not shown) at constant velocity. As shown, the takeup sprocket 24 also includes sprocket teeth 27 for appropriate engagement with film perforations 25 or the like. The supply and takeup sprockets 22 and 24 are normally driven at the same rotational speeds and may, if desired, be belt driven or the like by a common drive motor (not shown), all in a well known manner.

Figure 1:
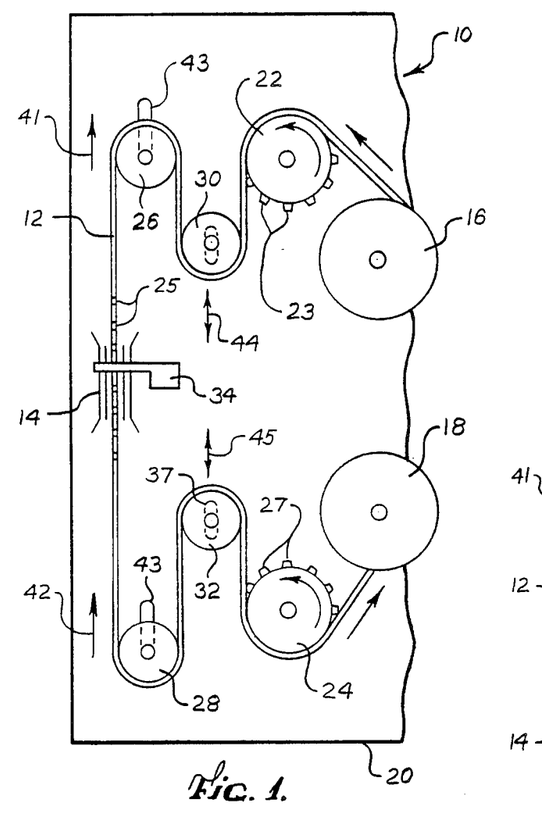
FIG. 1 is a diagrammatic view depicting one preferred form of a film transport assembly embodying the novel features of the invention and illustrating the transport assembly at the beginning of a film dwell period.

The motion conversion means comprises a pair of primary rollers 26 and 28 positioned respectively between the film gate 14 and the two sprockets 22 and 24 (and their associated supply and takeup reels). In addition, the motion conversion means includes a pair of compensation rollers 30 and 32 which are also positioned respectively between the film gate 14 and the two sprockets 22 and 24. The primary rollers 26 and 28 are displaced relative to the frame 20 in a synchronized, complementary fashion to increase the film path length on one side of the film gate 14 while correspondingly decreasing the film path length on the opposite side of the film gate, and vice versa. The compensation rollers 30 and 32 are similarly displaced in a synchronized, complementary manner but at a different cyclic rate to increase and decrease the film path length on opposite sides of the film gate. The specific displacement functions for the primary and compensation rollers are chosen to achieve a net film velocity of zero at the film gate 14 for an extended dwell period of about 180 degrees of the total frame-to-frame transport cycle, followed by a smooth film transport period for advancing the next film frame in sequence into registry with the film gate 14. As shown in FIG. 1 at the beginning of a film dwell period, a registration pin 34 at the film gate is advanced to extend through a film perforation 25 corresponding with the particular film frame halted at the gate, thereby locking that film frame in precise registration with the gate during the dwell period for appropriate film exposure or projection of images therefrom.

More specifically, during a film dwell period, the primary roller 26 and the compensation roller 30 preceding the film gate 14 cooperate to increase the film path length prior to the gate in a substantially linear manner which offsets the linear velocity applied to the film 12 by the supply drive sprocket 22. At the same time, the primary roller 28 and its associated compensation roller 32 positioned beyond the gate 14 cooperatively decrease the post-gate film path length in a substantially linear manner which offsets the linear takeup velocity attributable to the takeup sprocket 24. As a result, the film 12 is substantially captive at all times while the net film velocity at the gate is zero for a dwell period of 180 degrees.

At the conclusion of the dwell period, the primary roller 26 and associated compensation roller 30 cooperate to decrease the pre-gate film path length and thus sum with the linear film supply velocity to advance the film past the gate 14. The other primary roller 28 and adjacent compensation roller 32 act in a similar, complementary fashion to increase the post-gate film path length to captively accommodate film transport through the gate in excess of the linear takeup velocity. Importantly, the combined displacement functions of these rollers and the sprockets advance the film substantially as a sinusoidal displacement function with smooth acceleration and deceleration through a period of about 180 degrees thereby advancing the next film frame into registration with the gate at the beginning of the next dwell period.

Figure 2:
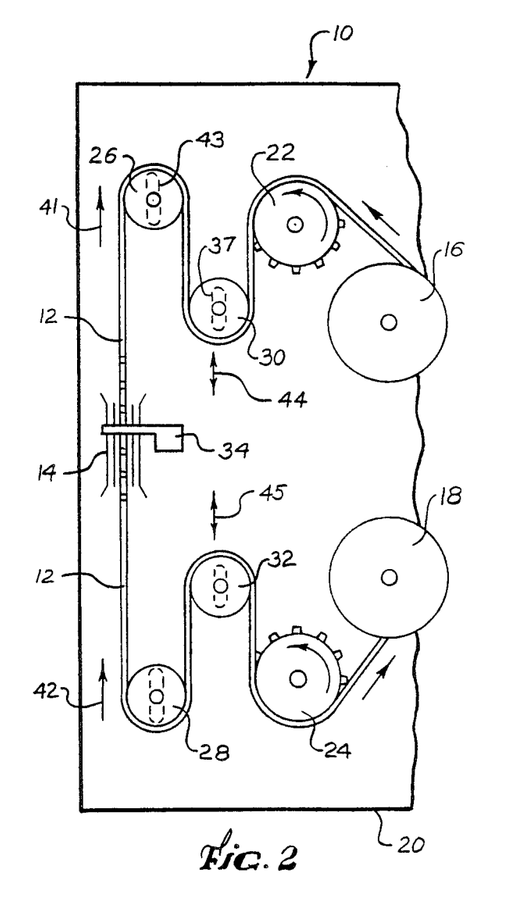
FIG. 2 is a schematic diagram similar to FIG. 1 and illustrating the film transport assembly generally midway through the film dwell period.
Figure 3:
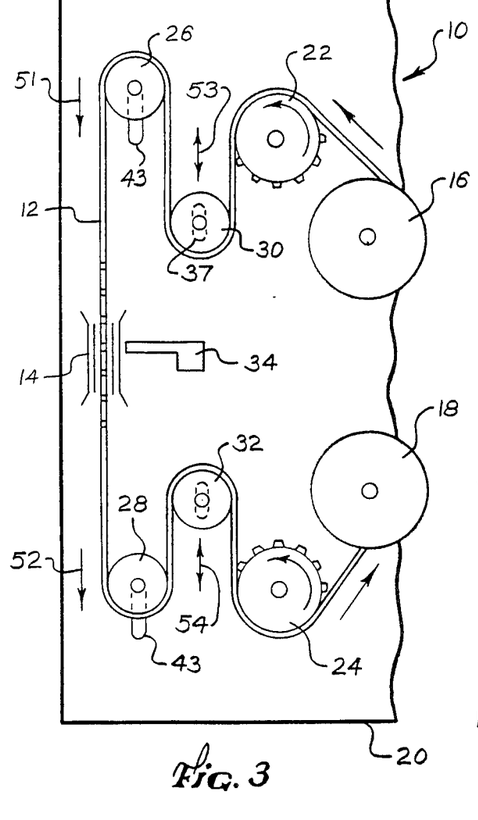
FIG. 3 is a schematic diagram illustrating the film transport assembly of FIG. 1 at the conclusion of the film dwell period and at the initiation of a film transport period.
Figure 4:
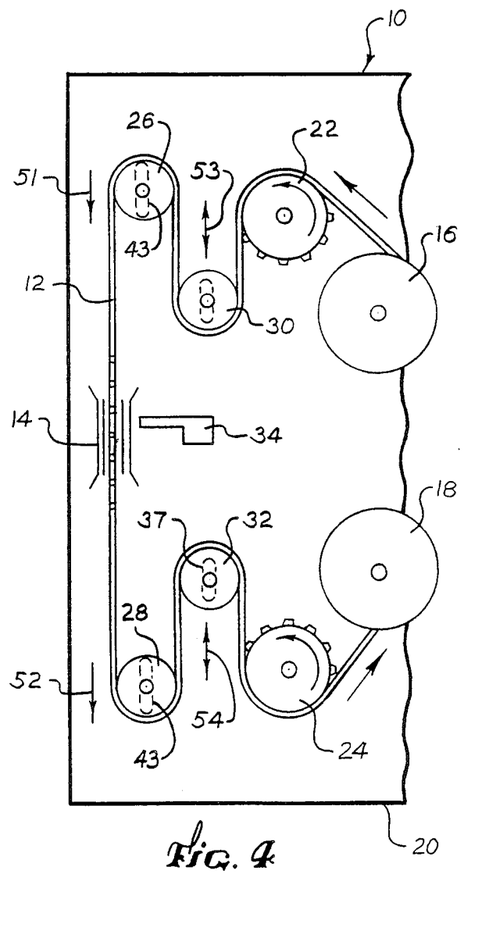
FIG. 4 is a schematic diagram similar to FIG. 1 and illustrating the film transport assembly generally midway through the film transport period.
Figure 5:
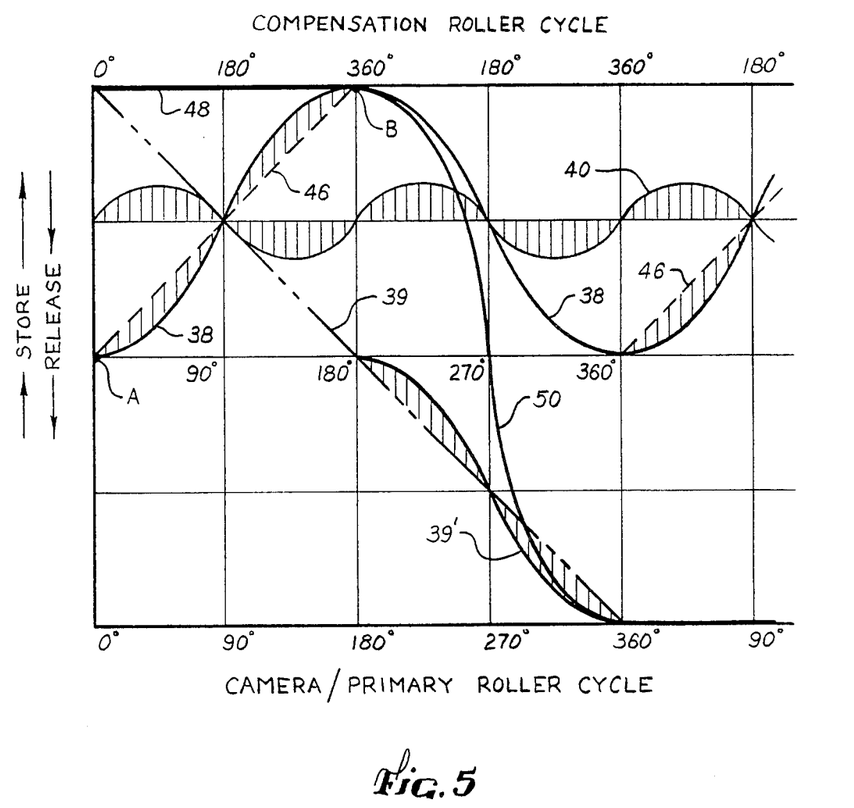
FIG. 5 is a graphic representation depicting the various film movements caused by the elements of the film transport assembly of FIGS. 1-4.

The various preferred mechanical movements and film velocity profiles for the film transport assembly 10 are shown in sequence in FIGS. 1-4, and represented graphically in FIG. 5 with respect to the rollers and sprocket at the supply side of the film gate 14. More particularly, the primary rollers 26 and 28 are displaced respectively toward and away from the film gate 14 through a sinusoidal displacement function for smooth acceleration and deceleration toward and away from the gate 14 between opposite end points of motion. The cycle rate for this sinusoidal displacement function corresponds with the total frame-to-frame transport cycle of the camera or projector, whereby the primary rollers 26 and 28 are displaced through one complete cycle, or 360 degrees, for each complete camera/projector cycle, for example, between points in time at the beginning of successive dwell periods. The displacement function for the primary roller 26 is represented in FIG. 5 by the sine wave curve 38 which depicts movement of the primary roller 26 upwardly, in a direction away from the film gate 14 over the first one-half, or 180 degrees, of the total cycle (as viewed in FIGS. 1 and 2) followed by return downward motion toward the film gate over the remainder, or second 180 degrees of the total cycle (as viewed in FIGS. 3 and 4). Such movement of the primary roller 26 is contrasted in FIG. 5 with the straight line 39 representing linear film velocity in a downward direction toward the gate attributable to the supply sprocket 22. The displacement function for the post-gate primary roller 28 would be similar except 180 degrees out of phase to represent upward motion toward the gate during the first one-half of the cycle (FIGS. 1 and 2) followed by downward motion away from the gate during the second one-half of the cycle (FIGS. 3 and 4).

The compensation rollers 30 and 32 are displaced toward and away from the film gate 14 in a complementary manner following a compensation function which is an approximate sine function, as represented with respect to the roller 30 by the curve 40 in FIG. 5. This compensation function curve 40 is selected to have a cycle rate equal to twice the cycle rate of the primary roller function 38. The magnitude of the compensation function 40 does not follow a true sine wave curvature but instead has a magnitude for summation with the primary roller displacement to yield a specific net velocity result controlling film dwell and transport motion past the film gate 14. More specifically, at the beginning of the dwell period as shown in FIG. 1, the primary roller 26 is moved according to a displacement function having a substantially sinusoidal velocity profile along a path which may be a straight line path in a direction away from the gate 14 as illustrated by arrow 41, thereby increasing the path length to the gate to store film. This continues for the duration of the dwell period in a direction away from the gate as represented by the portion of the curve 38 (FIG. 5) between points A and B. The other primary roller 28 moves in a similar fashion toward the gate 14 as represented by arrow 42 in FIG. 1, thereby decreasing the post-gate path length and releasing film. FIG. 2 illustrates the positions of the primary rollers 26 and 28 midway through the dwell period, whereas FIG. 3 illustrates these rollers at the conclusion of the dwell period. Elongated slots 43 or the like in the frame 20 accommodate this motion of the primary rollers.

During this primary roller movement, the compensation roller 30 is displaced initially downward toward the gate 14 and then returns upwardly to its initial position during the first one-half, or 90 degrees, of the dwell cycle. The roller 30 then moves further upwardly, away from the film gate and then returns again to its initial position during the second one-half or 90-180 degrees, of the dwell cycle as depicted by arrow 44 in FIGS. 1 and 2. However, unlike the curve 38 representing the straight line displacement of the primary roller 26 with the substantially sinusoidal velocity profile, which moves in the same direction as the primary roller 26, the curve 40 representing the straight line displacement of the compensation roller 30 with an approximate sinusoidal velocity profile moves in the opposite direction of the roller 30 since the effect of its motion is inverted with respect to the primary roller 26. That is, the compensation roller 30 stores film upon movement toward the gate and releases film upon movement away from the gate.

The other compensation roller 32 undergoes a similar but opposite motion relative to the gate, as depicted by arrows 45 (FIGS. 1 and 2). The effect of this motion is also shown to be inverted relative to that of the associated primary roller 28. Importantly, during the dwell period, the summation of the motions of the primary roller 26 and compensation roller 30 yields a net linear film velocity in a direction away from the gate to store film in a magnitude which offsets the linear film velocity attributed to the supply sprocket 22. Similarly, the sum of the motions of the primary roller 28 and the compensation roller 32 yields a net linear film velocity which offsets the linear film velocity attributed to the takeup sprocket 24 to release film to the takeup sprocket. This offsetting velocity feature is shown in FIG. 5 for the supply side of the gate by the rising straight line 46 which directly offsets the film velocity imported by the sprocket velocity represented by the descending straight line 39 to provide a net film velocity at the gate 14 of zero, as depicted by the film position line 48 on FIG. 5. This zero film velocity, of course, constitutes the film dwell period and continues through the first one-half of the total transport cycle. Elongated slots 37 or the like in the frame 20 are provided to accommodate this reciprocatory motion of the rollers 30 and 32.

Prior to the conclusion of the dwell period, the registration pin 34 is retracted from the film frame at the gate to permit film transport during the second one-half of the transport cycle. During this transport period, the primary rollers 26 and 28 are displaced through the second half of their sine wave velocity profiles function while the compensation rollers 30 and 32 are displaced through a second complete cycle according to their compensation functions. During this time period, the film displacement function of the compensation rollers 30 combines in a different manner adding to the straight line film displacement function 39 of the supply sprocket 22 such that the sum of these displacements results in substantially sine wave portion 39' (FIG. 5) releasing together one-half film frame length in sinusoidal fashion. This sine wave portion 39' is added to the identical descending portion of sine wave 38 of the primary roller 26, to produce a composite sine wave function 50 of amplitude sufficient to release one complete film frame for transport to and through the gate.

At the same time, the motion of the compensation roller 32 combines with the straight line velocity of the takeup sprocket 24, to produce a sine wave portion (similar to the portion 39' in FIG. 5) to transport film one-half frame away from the gate. This portion is added to the film displacement caused by the equivalent motion of the primary roller 28 away from the gate, so that one complete film frame is drawn through the gate and over the sprocket 24 for winding onto the takeup reel 18. Thus, through the combined motions of the primary and compensation rollers on both sides of the gate, the film is subjected to smooth acceleration and deceleration to align the next film frame in sequence in registry with the gate for the next dwell period. During this film transport motion, the primary rollers 26 and 28 are displaced in the directions illustrated by arrows 51 and 52 in FIGS. 3 and 4, whereas the compensation rollers are displaced through a second complete cycle as represented by the double ended arrows 53 and 54 in FIGS. 3 and 4.

Figure 6:
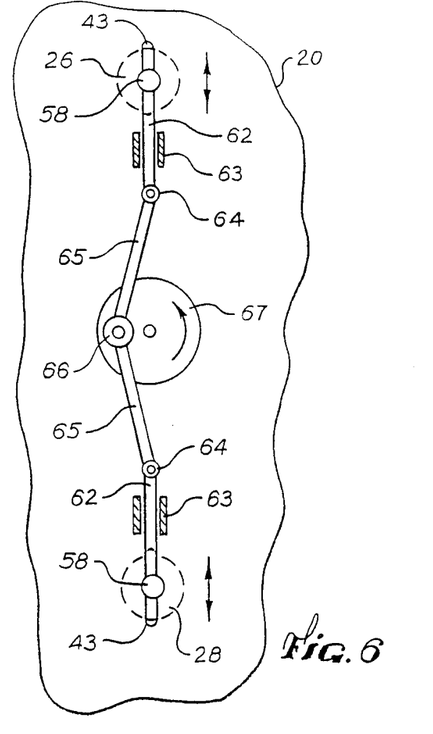
FIG. 6 is a schematic diagram illustrating one form of a drive crank mechanism for displacing primary rollers of the film transport assembly.

To achieve the desired sine wave velocity profiles of the primary rollers 26 and 28, these rollers may be driven in unison along their respective slots 43 by a drive crank mechanism as depicted generally in FIG. 6. For example, the rollers 26 and 28 may include axially centered pins 58 captured within the elongated parallel slots 43 in the frame 20 or the like for back and forth movement relative to the film gate (not shown in FIG. 6). The pins 58 are in turn carried by slide bars 62 captured for linear translation by guide blocks 63 or the like and connected in turn by pivots 64 and drive links 65 to a drive pin 66 positioned eccentrically on a rotating drive wheel 67. Appropriate rotational motion of the drive wheel 67 at a cycle rate corresponding with the total frame-to-frame transport cycle rate effectively displaces the rollers 26 and 28 through substantially sinusoidal functions and 180 degrees out of phase, thereby displacing the rollers respectively toward and away from the film gate.

Figure 7:
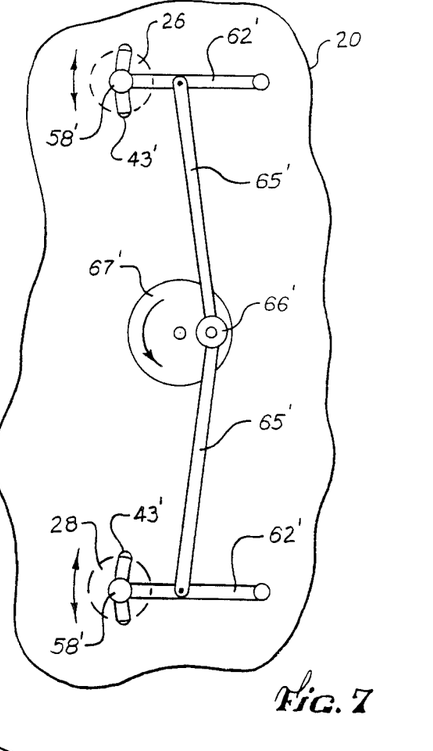
FIG. 7 is a schematic diagram illustrating an alternative drive crank mechanism for displacing the primary rollers of the film transport assembly.

FIG. 7 depicts an alternative drive crank mechanism for displacing the primary rollers 26 and 28 in opposite directions relative to the film gate. In this alternative mechanism, a central rotary drive crank 67' carries an eccentric drive pin 66' which is coupled in turn to a pair of oppositely extending drive links 65'. These drive links 65' are pivoted in turn generally to midpoints of oscillatory follower links 62' each having one end pivoted, for example, to the camera/projector frame 20 and an opposite end carrying pins 58' sliding within elongated, although somewhat arcuate slots 43'. The primary rollers 26 and 28 are carried in turn by the pins 58' for movement therewith.

In the embodiment of FIG. 7, rotational driving of the drive crank 67' reciprocates the primary rollers 26 and 28 generally through sinusoidal displacement functions in opposite directions relative to a film gate. Any errors introduced into the mechanism due to the secant effect arising from displacement of the rollers along the somewhat arcuate slots 43' will be minimal.

Figure 8:
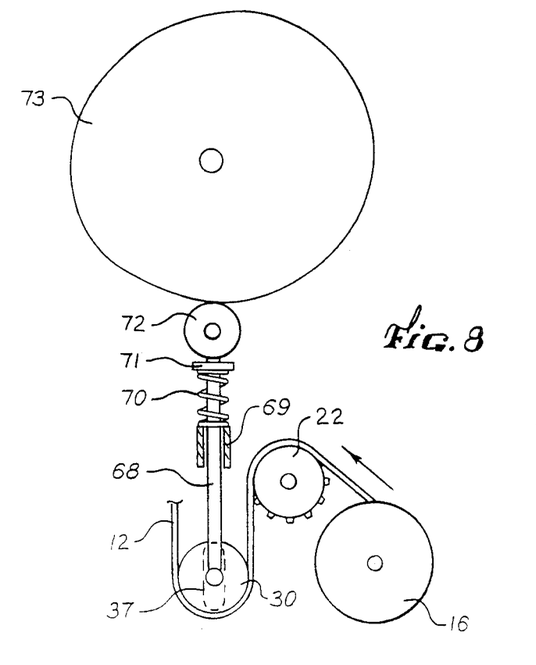
FIG. 8 is a schematic diagram depicting one form of a cam mechanism for displacing compensation rollers of the film transport assembly.

Cam-driven mechanisms may be used to obtain the desired displacement functions for the compensation rollers 30 and 32. More particularly, with reference to FIG. 8, the pre-gate or supply side compensation roller 30 may be carried at the end of a slide bar 68 retained within guide blocks 69 for substantially linear displacement of the roller 30 toward and away from the film gate 14 (not shown). Spring means 70 or the like may be provided to react between the guide blocks 69 and a retainer 71 or the like for maintaining a cam follower roller 72, for example, in rolling contact with a shaped, noncircular rotating cam 73. The profile of the cam periphery, of course, is designed to produce the reciprocal motion, namely, the compensating approximate sine function curve 40 (FIG. 5) for the compensation roller, and at the cycle rate depicted in the graph of FIG. 5. This double cycle motion can be obtained by rotating the cam 73 at the appropriate speed or by providing the cam with multiple cyclic faces in which case the cam could be rotated at a slower speed. A similar cam mechanism can be used, of course, for complementary displacement of the post-gate compensation roller 32, or the rollers 30 and 32 can be linked for complementary movements. Still further, as another alternative, the illustrative return-spring 70 can be omitted by linking the rollers 30 and 32 and driving both rollers with matched opposite or conjugate cams.

Figure 9:
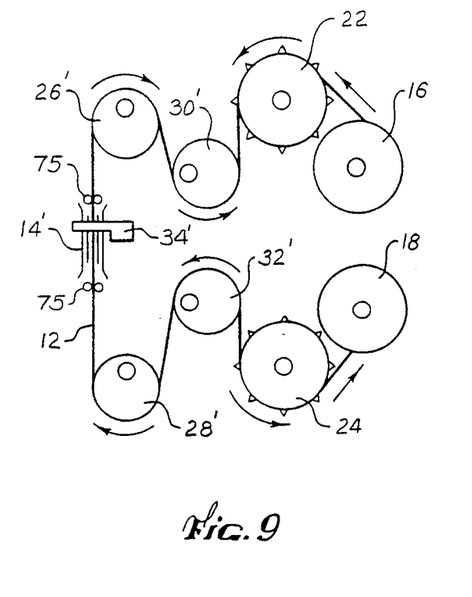
FIG. 9 is a schematic diagram illustrating one alternative form of the film transport assembly depicted at the beginning of a film dwell period.
Figure 10:
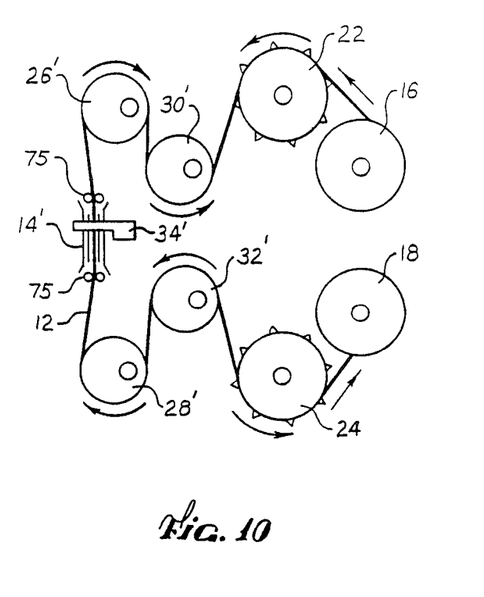
FIG. 10 is a schematic diagram similar to FIG. 9 but illustrating the transport assembly generally midway through the film dwell period.
Figure 11:
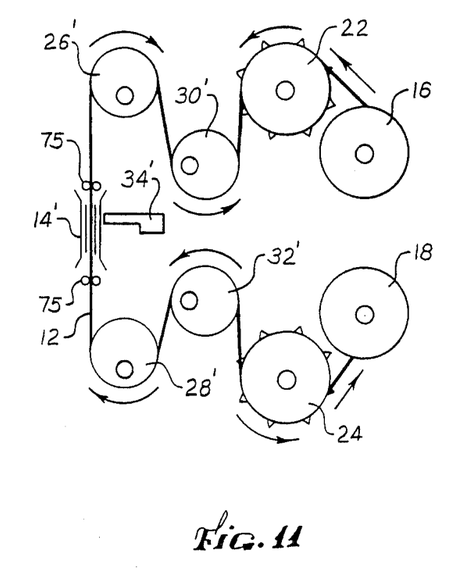
FIG. 11 is a schematic diagram similar to FIG. 9 and illustrating the film transport assembly at the conclusion of the dwell period and at the beginning of a film transport period.
Figure 12:
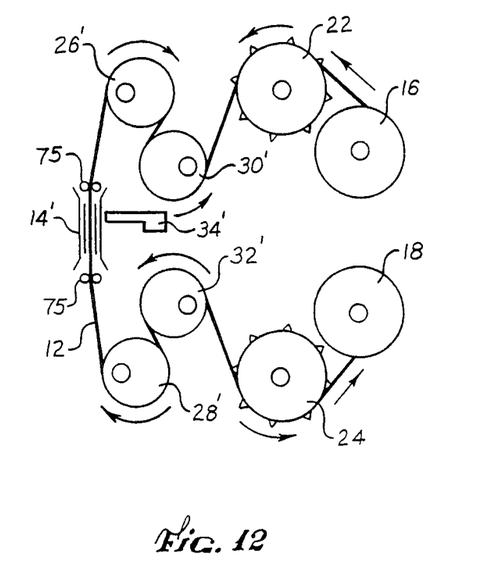
FIG. 12 is a schematic diagram similar to FIG. 9 and illustrating the transport assembly generally midway through a film transport period.

FIGS. 9–12 show one alternative mechanical arrangement of the invention, wherein the primary and compensation rollers comprise eccentrically orbiting rollers in lieu of the reciprocating rollers and related cam-type mechanisms used for the embodiment of FIGS. 1–4. Since eccentric rollers are easily balanced for smooth dynamic operation, this embodiment is especially suited for high speed applications typically using a small film format. More specifically, as shown in FIGS. 9–12, eccentric primary rollers 26' and 28' are provided in combination with eccentric compensation rollers 30' and 32' for advancing film 12 intermittently relative to a film gate 14'. In this version, the dimensions and eccentricities of the rollers are chosen whereby the primary rollers 26' and 28' essentially displace toward and away from the gate in accordance with the sine wave curve 38 (FIG. 5) described with respect to the embodiment of FIGS. 1–4. The compensation rollers 30' and 32' are arranged to displace film relative to the gate generally according to a substantially true compensating sine wave function described relative to FIGS. 1–4, and with the rotational speed twice the rotational speed of the primary rollers. FIG. 9 shows the position of the various rollers at the beginning of a dwell period, with a registration pin 34' engaged with film 12 halted at the gate 14'; FIG. 10 depicts the positions of the various rollers midway through the dwell period; FIG. 11 shows the roller positions at the conclusion of the dwell period and with the registration pin 34' withdrawn to permit film transport to the next frame in sequence; FIG. 12 shows the various roller positions generally midway through the film transport cycle. Conveniently, guide rollers 75 may be positioned immediately before and after the gate to insure proper film alignment and registration therewith. Similarly, any film positioning errors arising due to angular film orientation as shown in FIGS. 9 and 12 may be offset by secant-effect adjustment mechanisms, as referenced for example, in *Phased Roller Movement*, Volume 94, Proceedings of the Society of Photo-Optical Instrumentation Engineers, pages 62–66 (1976). However, the amplitudes of such secant effects will be small, although such are depicted in FIGS. 9–12 in exaggerated form for ease of description.

Accordingly, both of the described embodiments of FIGS. 1–4 and 9–12 provide substantially captive loop film transport at all times yet maintain the film stationary at the film gate for an extended dwell period of up to 180 degrees of the total frame-to-frame transport cycle. This operation is achieved with the moving primary and compensation rollers which cooperatively offset sprocket velocity during the dwell period and then add to the sprocket velocity during the transport period for smooth film transport with a sinusoidal-type velocity profile. Importantly, this operation occurs with relatively small actual displacements of the rollers thereby adapting the system for high speed operation without undesired mechanical instability. For example, with respect to FIGS. 1–4, the displacement function for the primary rollers 26 and 28 has a peak-to-peak magnitude of one-half film frame such that the primary roller movement will offset or add to the sprocket velocity which proceeds at one-half film frame per one-half cycle of the camera or projector. However, due to the pulley effect of the rollers, the excursion required to produce this film displacement during one-half of the total cycle will be one fourth amplitude, or an eccentric radius in the embodiment of FIGS. 9–12, of only one eighth frame length. The compensation rollers will have a smaller peak-to-peak displacement, typically about one-fourth of the primary roller excursion. This results in a total displacement of only one sixteenth of a frame length, and a half amplitude, or eccentric radius in the embodiment of FIGS. 9–12, of only about one thirty-second of a frame length.

Figure 13:
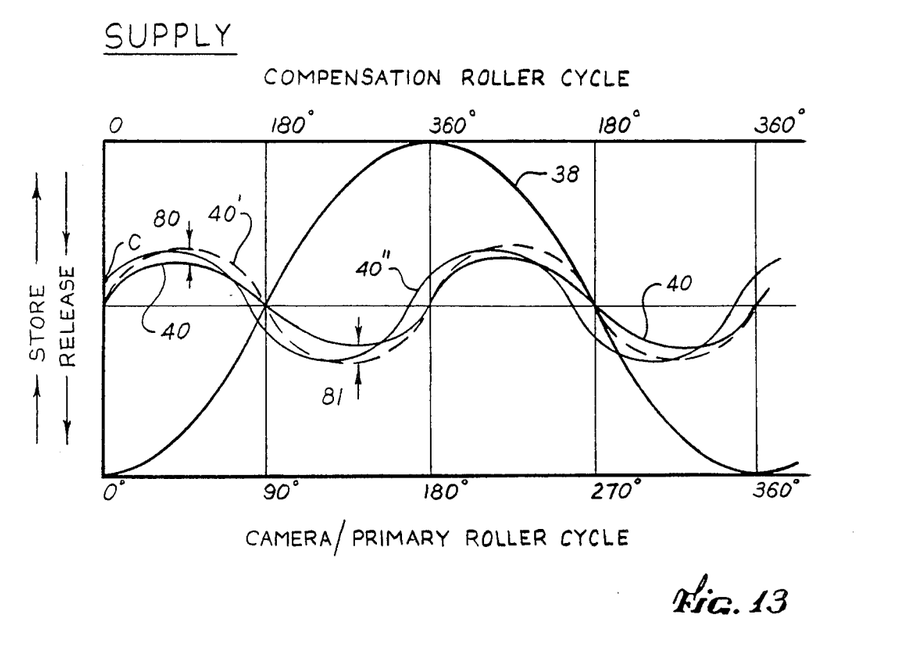
FIG. 13 is a graphic representation illustrating simplified film displacement functions for the primary and compensation rollers at the film supply side before the film gate, and further depicting function phase shift for preventing film binding during transport assembly operation.
Figure 14:
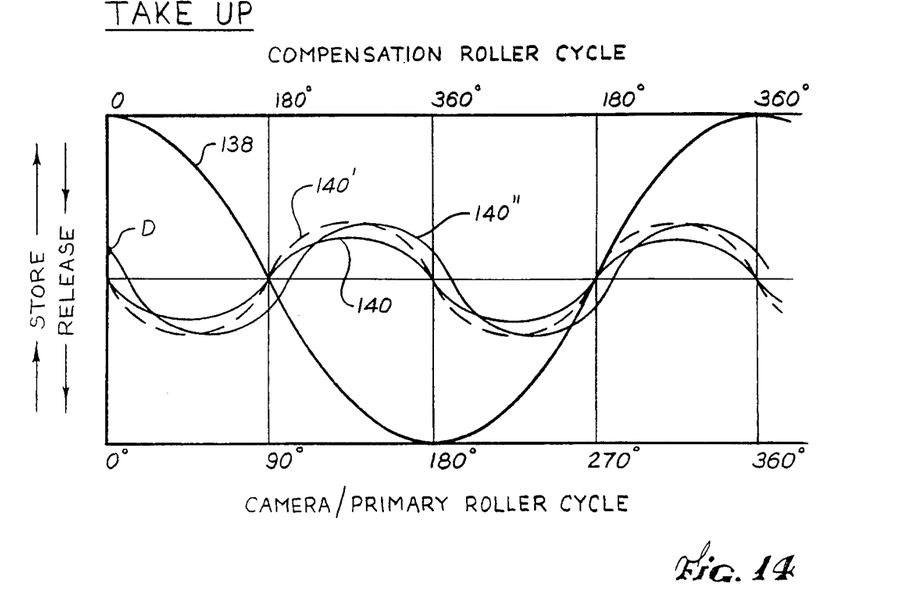
FIG. 14 is a graphic representation similar to FIG. 13 but illustrating simplified film displacement functions for the primary and compensation rollers at the film takeup side after the film gate.

As shown graphically in FIGS. 13 and 14, the specific shapes of the film displacement functions can be simplified to permit use of a true sine wave function for the compensation rollers. This eliminates any manufacturing and/or tolerance difficulties arising in efforts to reproduce the approximate sine wave function 40 depicted, for example, in FIG. 5, and greatly facilitates overall balancing. Moreover, when eccentric circular rollers are used as shown in FIGS. 9–12, the compensation rollers will normally follow a general sine wave function. Importantly, when sine wave functions are used, the displacement functions are advantageously phase shifted a small amount to prevent undesired film interference or binding during portions of the dwell and transport periods.

More particularly, with reference to FIG. 13, the film displacement function for the primary roller 26 at the supply side of the film gate is shown in the form of the sine wave curve 38 which indicates primary roller displacement away from the gate, or storing film, for the first one-half cycle (dwell period) followed by displacement toward the gate, or releasing film, for the second one-half cycle (transport period). The film displacement caused by this primary roller motion is sumemed with that caused by the motion of the compensation roller 30, depicted by the compensation function 40, to yield the dwell and transport periods, as previously described. However, wen this compensation function 40 is replaced by a simplified true sine wave displacement function having the same or steeper slope at the beginning of the cycle, a displacement function 40' results having a similar overall profile but a larger peak-to-peak amplitude. During the first one-half of the dwell period, or first one-fourth cycle, the larger amplitude of the compensation roller function 40' storing film yields a brief interval with a small amount of film bind or interference depicted in FIG. 13 by arrows 80. During the next one-half of the dwell period, or second one-fourth cycle, however, a brief interval occurs wherein the compensation roller releases film by an amount exceeding the theoretical function 40 to create some film slack, as depicted by arrow 81 in FIG. 13. This binding and slack also occurs during the second one-half or transport period of the total cycle.

The binding problem is avoided by a slight phase shifting of the sine function for the compensation roller. Specifically, as shown by curve 40'' in FIG. 13, the displacement function is phase shifted to lag the function 40', with computer analysis demonstrating an optimum phase shift to be about 6 degrees of the total dwell and transport cycle. With this phase shift, the film tension can be adjusted to substantially eliminate slack at the beginning of the dwell period for precise frame registration at the gate. This point on the function 40'' is depicted in FIG. 13 by the letter C. From this point, movement of the compensation roller to store film is approximately equal to the maximum displacement of the compensation function 40 away from the X-axis, thereby substantially eliminating film bind. However, film release by the compensation roller movement, as shown by the curve 40'', relative to the point C, exceeds the displacement of the compensation function 40 and this displacement yields a small amount of film slack during brief portions of the cycle. This small slack beneficially decreases overall driving load and film wear and is substantially taken up at the beginning of each dwell cycle for accurate film frame positioning and alignment with a registration pin or the like.

A similar phase shifting of the sine displacement functions will eliminate film binding due to roller motion on the takeup side of the film gate. More particularly, as viewed in FIG. 14, the primary roller displacement function is depicted by the sine curve 138, whereas the compensation function for the compensation roller is represented by the curve 140. A true sine function 140' for the compensation roller is shown with a slope equal to or greater than the function 140 at the beginning of the dwell period. However, without phase shift, this function 140' would result in film bind during the second one-half portion of the dwell period due to excess displacement, or storing of film by the compensation roller. During the first one-half of the dwell period, film slack would occur.

To avoid this film bind, a phase-shifted sine function 140'' is provided to lead the function 140'. The film tension is adjusted for substantially zero slack at the beginning of th dwell period, as indicated at point D in FIG. 14. From this point D, compensation roller motion releasing film exceeds the peak half amplitude of the compensation function 140 to provide beneficial slack. However, compensation roller motion in the opposite direction relative to point D, storing film, does not exceed the half-amplitude of the function 140, and undesirable bind is avoided in the manner as described previously with respect to FIG. 13.

Figure 15:
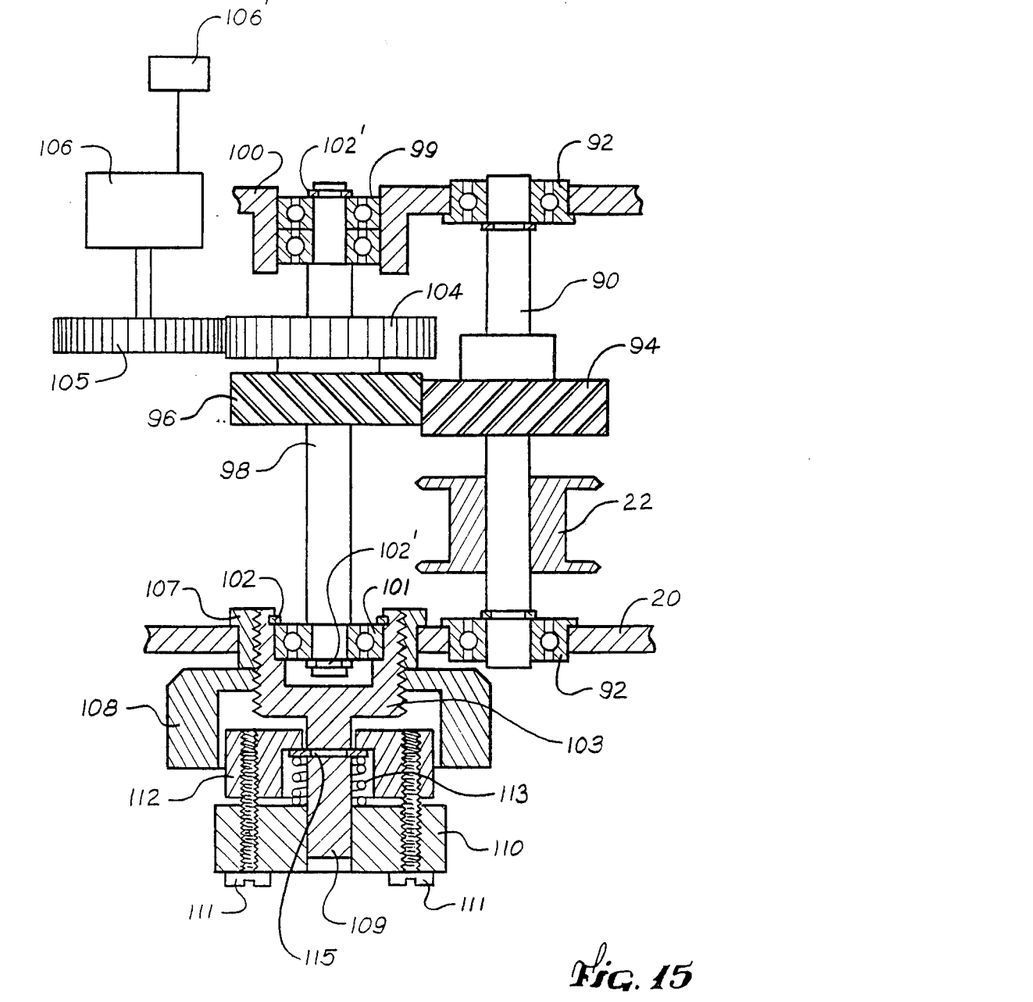
FIG. 15 is a somewhat schematic illustration of an adjustment mechanism for adjusting film position and tension.

FIG. 15 shows one mechanical arrangement for adjusting precise film position at the film gate, and film tension to a predetermined level, wherein this mechanism is shown for use with the supply sprocket 22, although the mechanism is used advantageously with both sprockets 22 and 24 to adjust the film at both sides of the gate. More specifically, as shown in FIG. 15, the supply sprocket 22 is rotatable with a drive shaft 90 supported in bearings 92 on the frame 20. The drive shaft 90 also carries a helical gear 94 which is positioned in meshed relation with a second helical gear 96 on an adjacent, parallel shaft 98, with the gear 96 having its teeth angled in an opposite direction. One end of this parallel shaft 98 is rotatably supported within bearings 99 which in turn are axially slidable within a frame bushing or collar 100, whereas the opposite end is supported by a bearing 101 captured axially by a retainer 102 against a shoulder of an adjustment collar 103. Retainers 102' in turn fasten bearings 99 to one end of shaft 98, and bearing 101 on its other end against shoulders shown. A spur gear 104 or the like on the parallel shaft 98 is driven in turn by a drive gear 105 which may be appropriately rotated by a drive motor 106 or the like. The motor 106 includes means 106' for locking the drive gear 105 during position or tension adjustment, as will be described.

The adjustment collar 103 comprises an externally threaded cup which is threaded into an outer collar 107 fixed on the frame 20. An outer lock ring 108 is also threaded about the collar 103 and can be rotated into tight abutting engagement with the outer collar 107 to lock the adjustment collar 103 against rotation therein. As a result, the axial position of the helical gear 96 and the shaft 98 can be fixed by locking the outer lock ring 108 against the outer collar 107.

A central extension shaft 109 protrudes outwardly from the adjustment collar 103 for sliding reception into a central bore formed within an outer adjustment knob 110. This adjustment knob 110 is secured in turn by screws 111 or the like to an inner friction member 112 positioned about the extension shaft 109. A thrust spring 113 reacts between an inboard side of the knob 110 and a retaining ring 114 seated in an extension shaft groove 115 at the outboard side of the friction member 112. Accordingly, the thrust spring 113 applies a force between the knob 110 and the extension shaft 109. This force can be preadjusted by advancing or retracting the screws 111 within the friction ring 112, typically in the laboratory or during initial manufacture, after which in-the-field tension adjustments can be made to the preselected level.

To adjust film position and tension, the lock means 106' is set to lock the drive gear 105. The lock ring 108 is then loosened from the outer collar 107 to permit the adjustment collar 103 to be rotated upon rotation of the adjustment knob 110 and within the limits of the spring force applied by the thrust spring 113. The locked drive gear 105 prevents the meshing gear 104 from rotating and thus further locks the helical gear 96 against rotation while permitting axial shift along the shaft 98. This knob rotation correspondingly shifts slightly the axial position of the helical gear 96 relative to the helical gear 94, and correspondingly rotates the latter gear slightly due to the angled nature of their meshed teeth. Such slight rotation of the gear 94 causes the sprocket 22 to rotate to adjust film position at the gate. When proper film position is achieved, the registration pin 34 (FIG. 1) is advanced to lock the film in place. Further rotation of the knob 110 is effective to increase film tension to the preselected level or torque until the knob rotation force overrides the friction force applied by the spring 113. When the knob 110 starts to slip relative to the collar 103, the lock ring 108 is retightened against the collar 107 to lock the components in place. Similar tension adjustment may then take place at the takeup side of the gate. Film may also be locked in place first by the registration pin 34 by providing sufficient film slack on both sides of the gate, followed by tension adjustment to remove the slack by adjusting the sprockets 22 and 24, as described.

Figure 16:
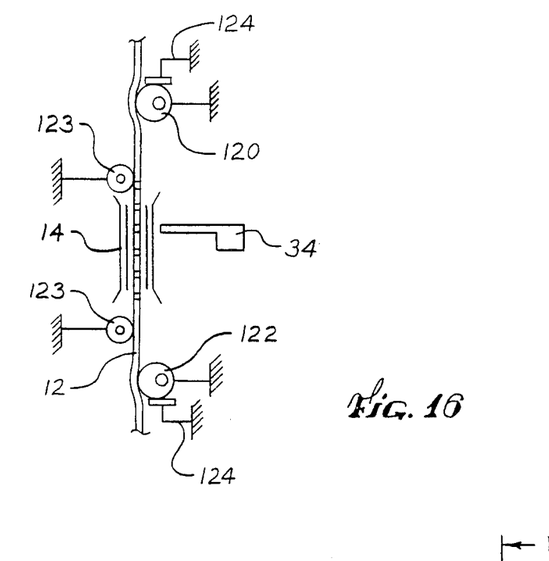
FIG. 16 is a schematic diagram illustrating one alternative tension adjustment and film positioning mechanism.

FIG. 16 illustrates schematically an alternative film position and tension adjustment mechanism. In this embodiment, eccentric adjustment rollers 120 and 122 are positioned to engage the film 12 on opposite sides of a film gate 14. Additional guide rollers 123 may also be provided before and after the gate to insure proper film alignment therewith. To adjust film position and tension, both rollers 120 and 122 are released by disengagement of appropriate brake or locking devices 124 whereupon film position is adjusted to permit entry of a registration pin 34 into a film frame perforation to lock the film in place. The eccentric rollers 120 and 122 can then be rotated about their eccentric axes to displace the film in a manner increasing tension to the desired level. When the desired tension is reached, the brake devices 124 can be reengaged to lock the rollers 120 and 122 in place.

Figure 17:
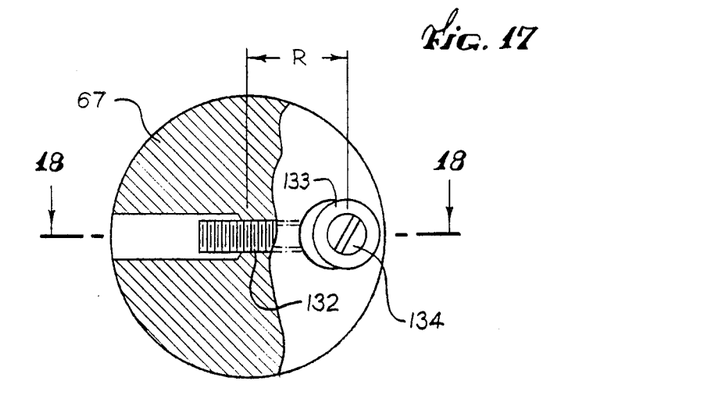
FIG. 17 is a simplified elevation view depicting a mechanism to adjust roller excursion, for use with the drive mechanisms of FIGS. 6 and 7, and further including film tension adjustment means, independently from position adjustments.
Figure 18:
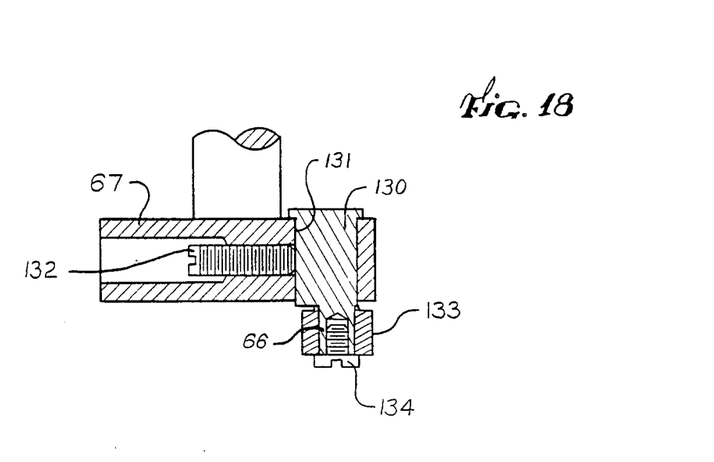
FIG. 18 is a fragmented horizontal sectional view taken generally on the line 18—18 of FIG. 17.

FIGS. 17 and 18 illustrate one relatively simple mechanism for controlling film tension, independently from adjusting film position at the beginning of the dwell cycle, by selection of the specific displacement function of the primary rollers, for example, when the drive-crank arrangements of FIGS. 6 or 7 are used. More particularly, as shown in FIGS. 17 and 18, the central drive crank 67 for these mechanisms may include a variably set pivot pin 66 for precision control over the peak-to-peak amplitude of the resultant displacement function. As shown, the pivot pin 66 protrudes outwardly from an eccentric base 130 seated within a mating bore 131 formed in the drive crank 67. A set screw 132 releasably locks the base 130 in place to fix the radial position of the pin 66. A pin sleeve 133 is restrained on the pin 66 to provide a convenient rotatable connection to the drive links shown in FIGS. 6 and 7.

Fine adjustment of the position of the pivot pin 66 is obtained by loosening the set screw 132. This permits the pin 66 to be rotated, for example, by means of a screwdriver or the like engaging a slot 134 in the end of the pin 66. Such rotation of the pin is accompanied by rotation of the base 130 which correspondingly alters the radial position of the pin. The set screw 132 can then be retightened to relock the base 130 in place. Upon resumed operation, the specific sine function displacement of the primary rollers will be altered to accommodate, for example, differences in film perforation pitch for different film formats.

The film transport assembly of the present invention thus provides an effective mechanism for obtaining extended film dwell up to 180 degrees at the film gate. This permits prolonged film exposure or prolonged image projection, with the result that faster camera/-projector cycle speeds or larger film formats can be used. The extended dwell features are enhanced by accurate control over film frame position and film tension during operation.

A variety of further features and advantages of the invention will be apparent to those skilled in the art. For example, in one variation, primary and compensation rollers as described are disposed only at the takeup side of the film gate, namely, between the film gate and the takeup sprocket. In this variation, the film is substantially captive at all times between the film gate and the takeup sprocket, while being allowed to form a free loop at the supply side of the film gate. Thus, the supply side could be arranged in a conventional manner while the intermittent film transport is achieved by the cooperative action of the primary and compensation rollers with the takeup sprocket. Accordingly, no limitation upon the invention is intended by way of the description and drawings, except as set forth in the appended claims.

What is claimed is:

1. A film transport assembly for intermittently advancing film past a film gate of a camera or projector, said film transport assembly comprising:
   supply means for advancing the film at substantially constant velocity toward the film gate;
   takeup means for drawing the film at substantially constant velocity from the film gate; and
   motion conversion means including a first set of rollers disposed along a film supply path between said supply means and gate and having the film threaded thereover, and further including a second set of rollers along a film takeup path between said gate and takeup means and having the film threaded thereover, said motion conversion means including means for increasing the length of said film supply path while decreasing the length of said film takeup path, and vice versa, in sequence, to provide a net film velocity of zero at the gate for a dwell period followed by a net film velocity advancing film past the gate for a transport period, said dwell and transport periods being substantially equal in time and said motion conversion means being adapted to mantain the film substantially unyieldingly captive throughout said dwell and transport periods;

said first and second set of rollers of said motion conversion means comprising a pair of primary rollers on opposite sides of the gate and supported for movement generally toward and away from the gate for increasing and decreasing the lengths of said film supply and takeup paths on opposite sides of the gate, said motion conversion means further including means for displacing said primary rollers through substantially opposite displacements generally toward and away from said gate with substantially sinusoidal velocity profiles having a complete cycle generally corresponding with one complete film transport cycle including said dwell and transport periods, whereby said primary rollers alternately increase the length of said film supply path while correspondingly decreasing the length of said film takeup path, and vice versa;

said path and second sets of rollers of said motion conversion means further comprising a pair of compensation rollers on opposite sides of the gate and supported for movement generally toward and away from the gate to decrease and increase the lengths of the film supply and takeup paths on opposite sides of the gate, said motion conversion means further including means for displacing said compensation rollers through substantially opposite displacements generally toward and away from said gate with approximate sinusoidal velocity proiles having a cycle rate generally twice the rate of said primary rollers velocity profile, whereby said compensation rollers alternately increase the length of said film supply path while correspondingly decreasing the length of said film takeup path, and vice versa;

said displacements of said primary and compensation rollers on the opposite sides of the gate increasing the length of said film supply path while decreasing the length of said film takeup path in a manner offsetting the film displacements imparted to the film by said supply and takeup means to yield a net film velocity at said gate of zero throughout said dwell period, said primary and compensation roller displacements further decreasing the length of said film supply path while increasing the length of said film takeup path in a manner summing with the film displacements imparted to the film by said supply and takeup means to yield a net film displacement past said gate with a substantially sinusoidal film velocity profile throughout said transport period.

2. The film transport assembly of claim 1 wherein said supply means includes a supply sprocket for advancing the film toward the gate with continuous, substantially constant velocity, and wherein said takeup means includes a takeup sprocket for drawing the film from the gate with the same continuous and substantially constant velocity.

3. The film transport assembly of claim 1 wherein said means for displacing said primary rollers comprises a drive crank mechanism.

4. The film transport assembly of claim 3 wherein said drive crank mechanism includes a rotatable drive wheel, a pivot on said drive wheel at an eccentric position, and link means coupled between said rollers and said pivot, said pivot being radially adjustable in position relative to a center of rotation of said drive wheel.

5. The film transport assembly of claim 1 wherein said means for displacing said compensation rollers comprises at least one cam-driven mechanism.

6. The film transport assembly of claim 1 wherein said primary and compensation rollers comprise rollers mounted for rotation about eccentric axes.

7. The film transport assembly of claim 1 wherein said means for displacing said compensation rollers comprises means for displacing said compensation rollers through a displacement with a substantially true sinusoidal velocity profile, said velocity profiles of each of said compensation rollers being phase shifted slightly with respect to the associated one of said primary rollers to substantially eliminate film binding.

8. The film transport assembly of claim 7 wherein said velocity profile of said compensation roller on the supply side of the gate is phase shifted to lag said velocity profile for said primary roller on the supply side of the gate by about six degrees of one complete transport cycle, and wherein said velocity profile of said compensation roller on the takeup side of the gate is phase shifted to lead the primary roller on the takeup side of the gate by about six degrees of one complete transport cycle.

9. The film transport assembly of claim 1 further including means for adjusting film position relative to the gate.

10. The film transport assembly of claim 1 further including means for adjusting film tension between said supply and takeup means.

11. The film transport assembly of claim 1 further including means for adjusting the magnitude of said velocity profiles for said primary rollers.

12. A film transport assembly for intermittently advancing film past a film gate of a camera or projector, said assembly comprising:

supply means for advancing the film at a substantially constant velocity along a film supply path toward the film gate;

takeup means for drawing the film at the same substantially constant velocity from the gate; and motion conversion means disposed along a film takeup path between said film gate and said takeup means, said motion means including means for decreasing the length of said takeup path in a manner offsetting the displacement imparted to the film by said takeup means to provide a net film velocity of zero at said film gate for a dwell period, said motion conversion means further including means for increasing the length of said takeup path to provide in cooperation with said takeup means a net film velocity advancing the film past said film gate for a transport period following said dwell period, said dwell and transport periods being substantially equal in time and proceeding in alternating sequence, said motion conversion means further including means for maintaining the film between said film gate and said takeup means substantially captive throughout said dwell and transport periods;

said means for decreasing and increasing the length of said takeup path including a primary roller and a compensation roller disposed along said takeup path and having the film threaded thereover, means for supporting said primary and compensation rollers for displacement generally toward and away from the film gate for altering the length of said takeup path, means for displacing said primary roller generally toward and away from said film gate with a substantially sinusoidal velocity profile having a cycle generally corresponding with one complete transport cycle including said dwell and transport periods, and means for displacing said compensation roller generally toward and away from said film gate with an approximate sinusoidal velocity profile having a cycle rate generally twice the rate of said primary roller velocity profile, said displacements of said primary and compensation rollers summing with each other to substantially offset the displacement imparted to the film by said takeup means to yield a net film velocity of zero at the gate throughout said dwell period, said displacements of said primary and compensation rollers summing with each other and with the displacement imparted to the film by said takeup means during said transport period to yield film advancement past said film gate with a substantially sinusoidal velocity profile;

said film supply path increasing in length during said dwell period to accommodate the net film velocity of zero at said film gate throughout said dwell period, and decreasing in length during said transport period to accommodate advancement of the film past said film gate during said transport period.

13. The film transport assembly of claim 7 wherein said primary and compensation rollers comprise rollers mounted for rotation about eccentric axes.

* * * * *

UNITED STATES PATENT AND TRADEMARK OFFICE
CERTIFICATE OF CORRECTION

PATENT NO. : 4,778,093

DATED : October 18, 1988

INVENTOR(S) : Renold, Walter

It is certified that error appears in the above-identified patent and that said Letters Patent is hereby corrected as shown below:

In column 3, line 18, delete "generally sinusoidal".
In column 3, line 21, after "smooth", insert
          -- substantially sinusoidal--.
In column 8, line 18, change "imported" to --imparted--.
In column 11, line 51, change "lag" to --lead--.
In column 12, line 20, change "lead" to --lag--.
In column 12, line 22, change "th" to --the--.
In column 16, line 19, change "lag" to --lead--.
In column 16, line 24, change "lead" to --lag--.

Signed and Sealed this

Eleventh Day of April, 1989

Attest:

DONALD J. QUIGG

Attesting Officer

Commissioner of Patents and Trademarks